3,773,895
REMOVAL OF ACIDIC GASES FROM GASEOUS MIXTURES

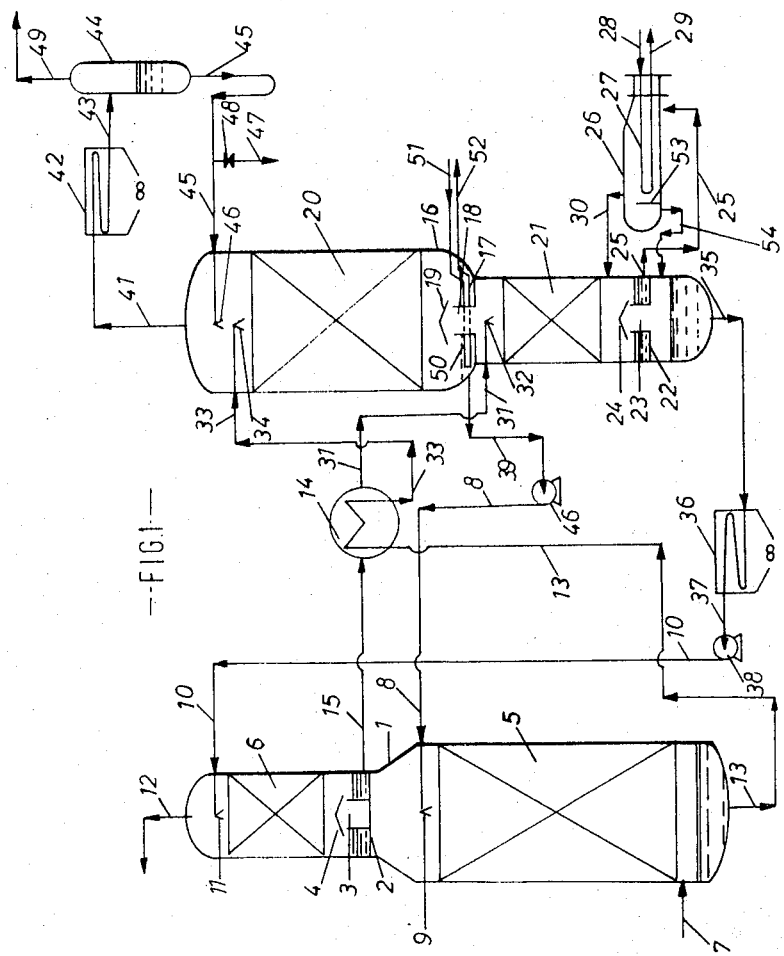

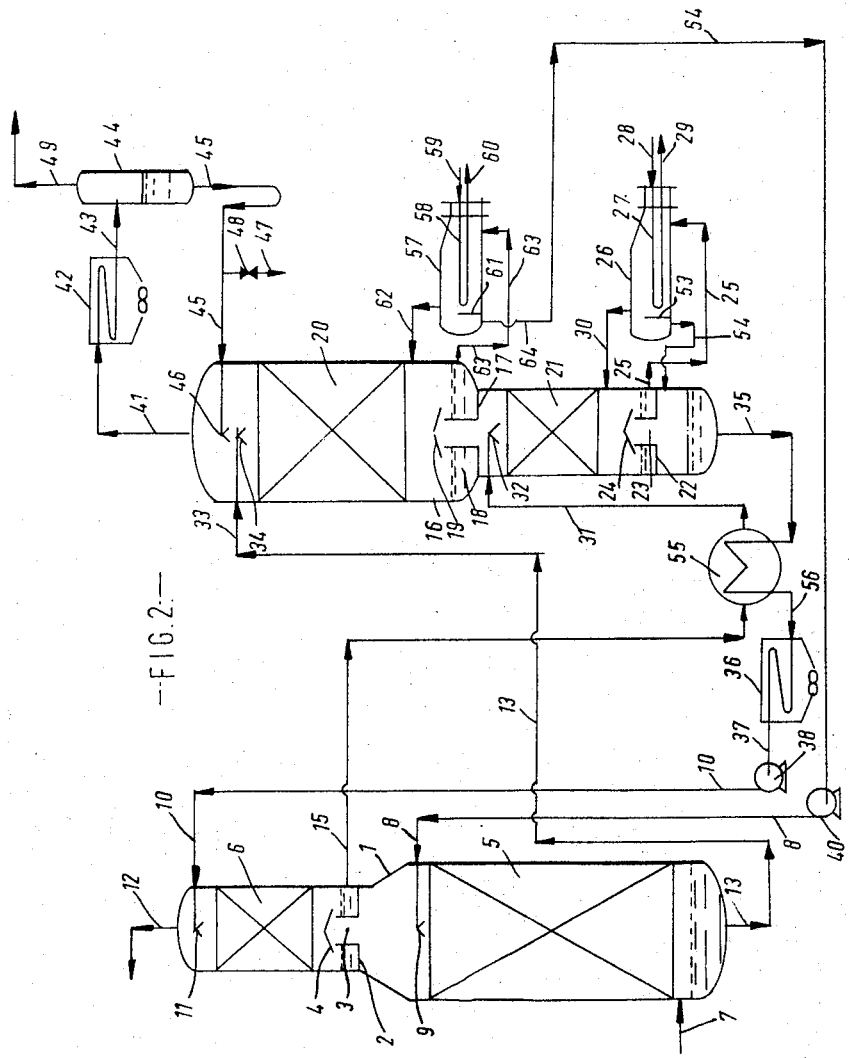

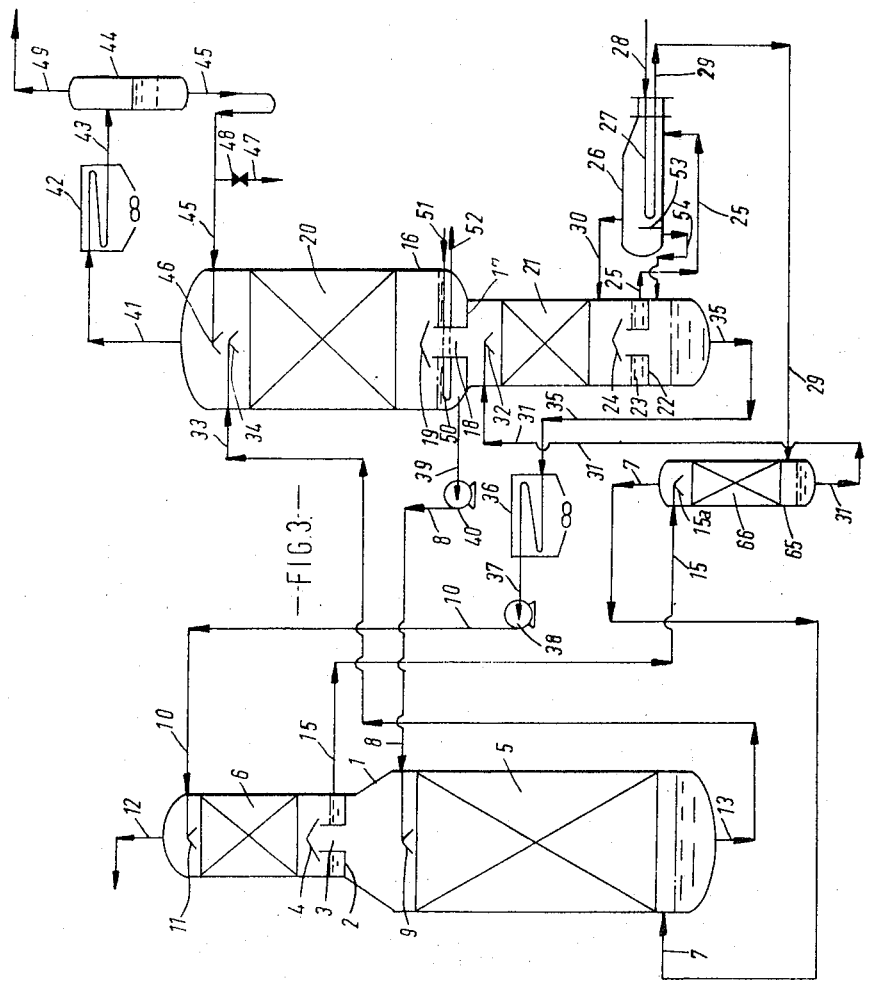

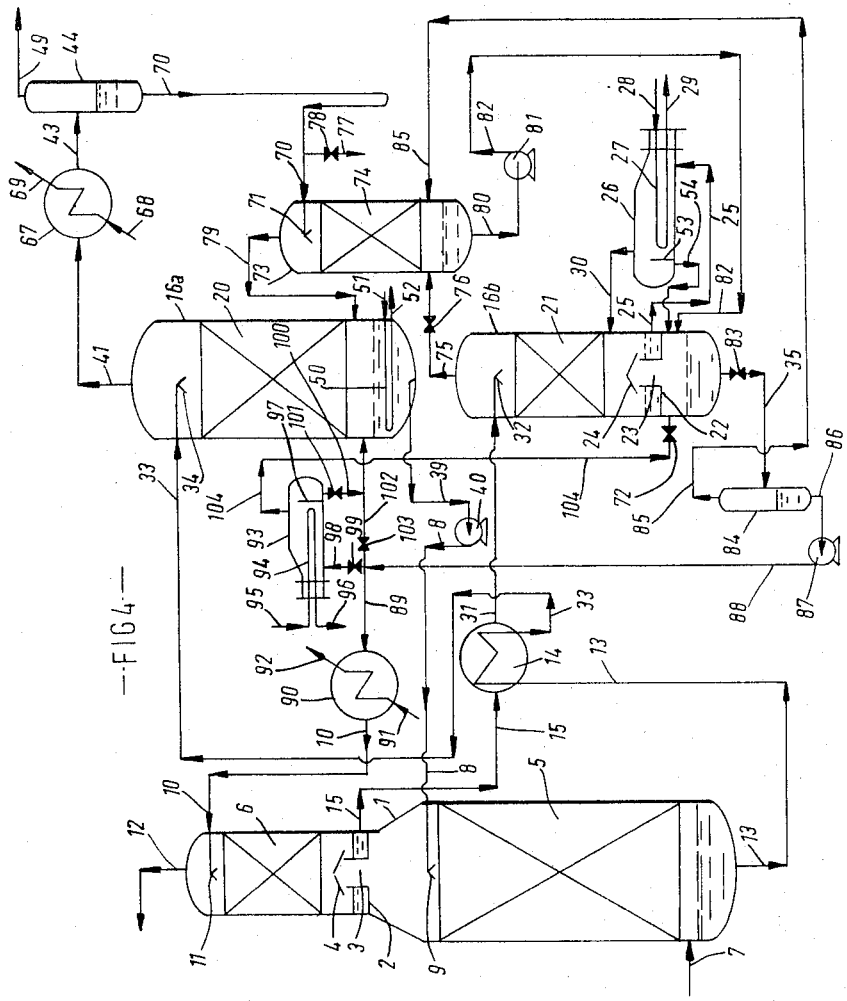
-FIG.4-

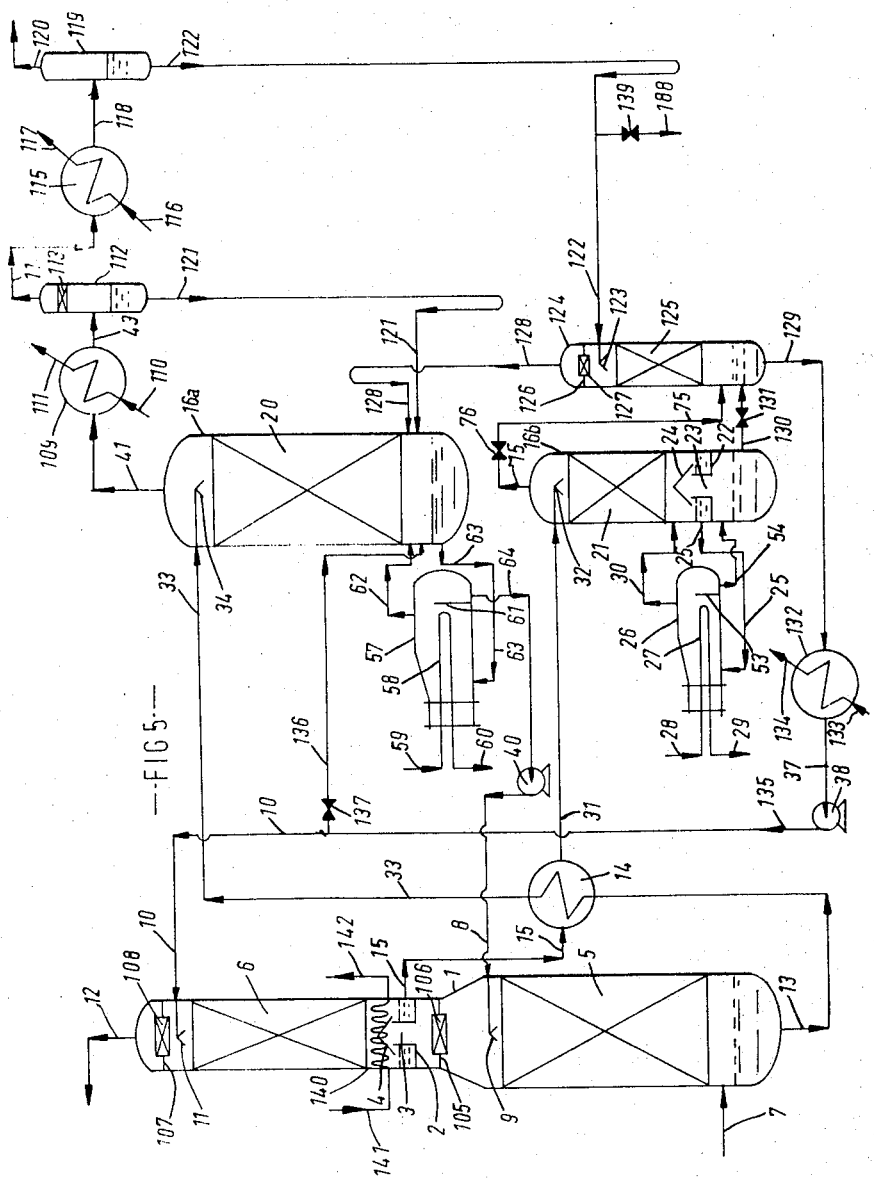

Harry Thirkell, Middlesbrough, England, assignor to Harry Thirkell, Middlesbrough, England
Continuation of application Ser. No. 56,174, July 9, 1970, which is a continuation of application Ser. No. 587,274, Oct. 17, 1966, both now abandoned. This application Dec. 15, 1971, Ser. No. 208,499
Int. Cl. B01d 53/34
U.S. Cl. 423—223                    11 Claims The present invention relates to the removal of acidic gases such as carbon dioxide and hydrogen sulphide from gaseous mixtures and is particularly applicable for obtaining a purified gaseous mixture having a low concentration of acidic gas or gases.

This is a continuation of application Ser. No. 56,174, filed July 9, 1970, and now abandoned which in turn is a continuation of application Ser. No. 587,274, filed Oct. 17, 1966, and now abandoned.

The present invention is an improvement in known processes wherein the gaseous mixture is scrubbed with an absorbent liquor in an absorber in which the acidic gases are removed, the "spent" liquor leaving the absorber and containing the acidic gases dissolved therein being passed to a regenerator in which the liquor is heated and stripped with steam, resulting in the regeneration of the liquor and the evolution of carbon dioxide and/or hydrogen sulphide from the liquor.

According to the present invention a process for the removal of acidic gases from gaseous mixtures comprises the steps of passing the gaseous mixture through a first absorption zone in contact with a first absorbent solution comprising a hot aqueous solution of a non-volatile reagent, such as potassium carbonate or tripotassium phosphate, and a volatile reagent, such as monoethanolamine or diethanolamine, to remove a major fraction of the acidic gases, passing the resulting gaseous mixture thence through a second absorption zone in contact with a second absorbent solution comprising a cooled aqueous solution of the same volatile reagent as is present in said first absorbent solution to remove substantially the remaining acidic gases from the gaseous mixture, passing the spent solution containing acidic gases dissolved therein from the second absorption zone to a second regeneration zone, passing a stream of steam in contact with the spent aqueous solution of said volatile reagent in the second regeneration zone to strip the acidic gases therefrom, discharging the stripping steam from the second regeneration zone, passing the spent solution containing acidic gases dissolved therein from the first absorption zone to a first regeneration zone, passing the stripping steam discharged from the second regeneration zone in contact with the spent aqueous solution of said non-volatile reagent and said volatile reagent in the first regeneration zone to strip the acidic gases therefrom, returning the regenerated solutions from their respective regeneration zones to their respective absorption zones, and maintaining the concentrations of the volatile reagent in the first and second absorption zones substantially constant.

According to the present invention there is also provided a process for the removal of acidic gases from gaseous mixtures which comprises the steps of passing the gaseous mixture through a first absorption zone in contact with a first absorbent solution comprising a hot aqueous solution of a non-volatile reagent, such as potassium carbonate or tripotassium phosphate, and a volatile reagent, such as monoethanolamine or diethanolamine, to remove a major fraction of the acidic gases, passing the resulting gaseous mixture thence through a second absorption zone in contact with a second absorbent solution comprising a cooled aqueous solution of the same volatile reagent as is present in said first absorbent solution to remove substantially the remaining acidic gases from the gaseous mixture, passing the spent solution containing acidic gases dissolved therein from the second absorption zone to a second regeneration zone, passing a stream of steam in contact with the spent aqueous solution of said volatile reagent in the second regeneration zone to strip the acidic gases therefrom, discharging the stripping steam from the second regeneration zone, passing the spent solution containing acidic gases dissolved therein from the first absorption zone to a first regeneration zone, passing the stripping steam discharged from the second regeneration zone in contact with the spent aqueous solution of said non-volatile reagent and said volatile reagent in the first regeneration zone to strip the acidic gases therefrom, returning the regenerated solutions from their respective regeneration zones to their respective absorption zones, and controlling the flow of stripping steam to each regeneration zone and recovering said volatile reagent carried over with the mixture of steam and evolved acidic gases at least leaving the first regeneration zone so that the concentrations of the volatile reagent in the regenerated solutions entering the first and second absorption zones are maintained substantially constant.

The stripping steam discharged from the second regeneration zone and which enters the first regeneration zone carries with it the acidic gases evolved in the second regeneration zone.

The gaseous mixture is passed through the first and second absorption zones preferably countercurrently to the flow of the regenerated absorbent solutions, and the stripping steam is passed through the second and first regeneration zones preferably countercurrently to the flow of the spent absorbent solutions.

When the first and second absorption zones are under superatmospheric pressure, the first and second regeneration zones are under substantially reduced pressure.

In the second regeneration zone some of the volatile reagent contained in the absorbent solution will be carried away with the stripping steam and will pass with the discharged stripping steam into the first regeneration zone, where it will be absorbed by the aqueous solution of the non-volatile and volatile reagent.

In the first absorption zone some of the volatile reagent contained in the absorbent solution will be carried away with the hot gaseous mixture and will pass with this gaseous mixture into the second absorption zone, where it will be absorbed by the cooled aqueous solution of the volatile reagent.

Thus some of the volatile reagent is stripped from the absorbent solution in the second regeneration zone and re-absorbed by the absorbent solution in the second absorption zone. To achieve good operating performance it is desirable that the concentrations of the volatile reagent in the regenerated solutions entering the first and second absorption zones are maintained substantially constant. This requires controlling the flow of stripping steam to each regeneration zone and recovering the volatile reagent carried over with the mixture of steam and evolved acidic gases at least leaving the first regeneration zone.

The flow of stripping steam to the second regeneration zone is preferably maintained at the minimum required for satisfactory regeneration of the spent absorbent solution entering the second regeneration zone. In the case where the stripping steam required for the first regeneration zone is substantially greater than that required for the second regeneration zone it is preferable to provide the additional steam entering the first regeneration zone by means of a reboiler or heating coil, heated by steam or some other hot fluid, coupled to the first regeneration zone, so as to avoid dilution of the absorbent solution in the first regeneration zone by condensation of steam entering from the second regeneration zone.

Stripping steam for the second regeneration zone may be provided by a reboiler coupled to the second regeneration zone heated by steam or some other hot fluid, for example a hot gaseous mixture under pressure and saturated with water vapour such as is passed into the first absorption zone.

The mixture of steam and evolved acidic gases leaving the first regeneration zone, carrying with it some of the volatile reagent, is passed to a cooler/condenser in which the gases are cooled and the condensate, containing the carried-over volatile reagent, condensed out. The condensate is separated from the cooled acidic gases in a separator/accumulator. In the case where the volatile reagent is such as diethanolamine, the condensate from the separator/accumulator is passed into the regenerated solution leaving the first regeneration zone, either by passing as reflux to the top of the first regeneration zone or to the base of the first regeneration zone.

In the case of a more volatile reagent such as monoethanolamine, some or all of the condensate from the separator/accumulator may be passed to a condensate reboiler in which a major fraction is vaporised and the vapour, containing a major fraction of the volatile reagent, is passed into the second regeneration zone and the effluent condensate, containing a minor fraction of the volatile reagent, is passed into the regenerated solution leaving the first regeneration zone. Alternatively, the mixture of steam and evolved acidic gases, containing some volatile reagent, discharged from the second regeneration zone may be passed to a vessel in which it is scrubbed with some or all of the condensate from the separator/accumulator so as to absorb the volatile reagent in the condensate. The mixture of steam and evolved acidic gases leaving said vessel is passed into the first regeneration zone and the condensate leaving the vessel is passed into the regenerated solution leaving the second regeneration zone. A side stream of the regenerated solution leaving the second regeneration zone is then withdrawn and passed into the regenerated solution leaving the first regeneration zone so as to maintain the concentrations of the volatile reagent in the regenerated solutions entering the first and second absorption zones substantially constant.

A condensate bleed may be taken from the condensate separated from the acidic gases in order to maintain a condensate balance over the plant as a whole.

To make up for losses of the volatile reagent in the purified gaseous mixture and the separated acidic gases, fresh volatile reagent may be added to the cooled regenerated absorbent solution entering the second absorption zone.

Heat economy may be achieved by preheating the spent absorbent solution leaving the second absorption zone by indirect heat exchange with hot regenerated absorbent solution leaving the second regeneration zone, or with hot spent absorbent solution leaving the first absorption zone, or with hot regenerated absorbent solution leaving the first regeneration zone.

In the case where the reboiler of the second regeneration zone is heated by a hot gaseous mixture under pressure and saturated with water vapour such as is passed into the first absorption zone and also the temperature of the gaseous mixture leaving the reboiler is higher than the temperature of the spent absorbent solution leaving the second absorption zone, said spent absorbent solution may be preheated by direct heat exchange with said gaseous mixture leaving the reboiler.

The hot regenerated absorbent solution leaving the second regeneration zone is cooled by indirect heat exchange with a cooling medium such as water or air, before entering the second absorption zone, in order to reduce the vapour pressure of the acidic gases in equilibrium with the solution.

The gaseous mixture leaving the first absorption zone may be cooled by indirect heat exchange with a cooling medium such as water or air before entering the second absorption zone, so as to obtain a lower temperature of the spent second absorbent solution leaving the second absorption zone and hence a lower content of the acidic gases in the purified gaseous mixture leaving the second absorption zone. This is best achieved by providing separate vessels containing the first and second absorption zones and providing a cooler externally of the vessels. However, the same cooling effect can be achieved by providing a cooling coil or coils in the space below the second absorption zone and above the liquor collecting tray for the spent second absorbent solution where the first and second absorption zones are incorporated in a single absorber vessel.

The absorbent solution entering the first absorption zone preferably has a major concentration of a non-volatile reagent and a minor concentration of a volatile reagent. In the case where the non-volatile reagent is potassium carbonate and the volatile reagent is monoethanolamine or diethanolamine, the absorbent solution entering the first absorption zone may contain from 5 to 40% by weight of potassium carbonate and from 1 to 20% by weight of the amine, and preferably from 30 to 35% by weight of potassium carbonate and from 2 to 6% by weight of the amine. The absorbent solution entering the second absorption zone may contain from 5 to 30% by weight of the amine.

In operation of the process some of the absorbent solution, containing a non-volatile reagent, in the first absorption zone will be carried over by entrainment in the gaseous mixture into the second absorption zone, thus contaminating the solution of the volatile reagent in the second absorption zone with the non-volatile reagent. Also some of the spent absorbent solution, containing the non-volatile reagent entering the first regeneration zone will be carried over by entrainment in the evolved acidic gases and flashed steam into the cooler/condenser and then returned via the separator/accumulator into the regenerated solution leaving the first regeneration zone. If it is desired to prevent build up of the non-volatile reagent in the absorbent solution entering the second absorption zone a sidestream of the regenerated solution leaving the second regeneration zone may be withdrawn and passed to a reboiler, heated by steam or some other hot fluid in which a major fraction is vaporised and the vapour, containing a major fraction of the volatile reagent, is passed into the second regeneration zone and the effluent liquor, containing the non-volatile reagent and a minor fraction of the volatile reagent is passed into the regenerated solution leaving the first regeneration zone. Such an arrangement of withdrawn sidestream and reboiler is particularly suitable in the case of a more volatile reagent such as monoethanolamine. Alternatively, a sidestream of the regenerated solution leaving the second regeneration zone may be withdrawn and passed directly into the regenerated solution leaving the first regeneration zone, without passing through a reboiler.

It is known that when a volatile reagent such as monoethanolamine or diethanolamine is added to an aqueous solution of a non-volatile reagent such as potassium carbonate the activity of the solution for absorbing acidic gases is appreciably increased.

The second regeneration zone may be maintained at a higher pressure than the pressure in the first regeneration zone, by controlling the pressure of the stripping steam and acidic gases discharged from the second regeneration zone by means of a pressure control valve, in order to achieve a higher degree of regeneration of the aqueous solution of the volatile reagent in the second absorption zone. In this case, to achieve heat economy the hot regenerated solution leaving the second regeneration zone may be passed to a vessel vented to the first regeneration zone, so that steam is flashed in this vessel from the hot regenerated solution, which steam passes into the first regeneration zone. The hot regenerated solution leaving said vessel, partially cooled by the flashing of steam, is then further cooled by indirect heat exchange and the cooled solution passed to the second absorption zone. The steam flashed from the hot regenerated solution leaving the second regeneration zone in said vessel may be scrubbed, in either the same or a separate vessel, with some or all of the condensate from the separator/accumulator in order to absorb in the condensate the volatile reagent contained in the flashed steam. The effluent condensate is passed into the regenerated solution leaving the second regeneration zone.

If a gaseous mixture containing acidic gases is to be treated so as to produce a purified gaseous mixture containing a low concentration, say 0.2% by volume or lower, of acidic gases, the process according to the present invention may be advantageous over previously known processes in that the capital cost of the equipment may be reduced and the external heat required for raising stripping steam may be reduced.

The first and second absorption zones may be contained in separate absorber vessels or in a single absorber vessel. They may conveniently be contained in a single absorber vessel comprising a lower larger part partitioned from an upper smaller part by a liquor collecting tray provided with a central opening duct surmounted by a cowl. The first absorption zone is contained in the lower larger part of the vessel and the second absorption zone is contained in the upper smaller part of the vessel, each absorption zone comprising one or more zones of packing material, such as contact rings, or a number of bubble-type or sieve-plate trays.

The first and second regeneration zones may be contained in separate regenerator vessels or, in the case where the pressure in the regeneration zones is substantially the same, in a single regeneration vessel. In the latter case they may conveniently be contained in a single regenerator vessel comprising an upper larger part partitioned from a lower smaller part by a liquor collecting tray provided with a central opening duct surmounted by a cowl. The first regeneration zone is contained in the upper larger part of the vessel and the second regeneration zone is contained in the lower smaller part of the vessel, each regeneration zone comprising one or more zones of packing material, such as contact rings, or a number of bubble-type or sieve-plate trays. The lower part of the lower smaller part of the vessel is provided with a liquor collecting tray with a central opening duct and is connected to a reboiler. A reboiler, or heating coil, may also be provided for the liquor which collects on the liquor collecting tray which partitions the lower smaller part from the upper larger part of the vessel.

The present invention will now be further described by way of example with reference to the accompanying drawings, in which, FIG. 1 is a flow diagram of one embodiment of the present invention, FIG. 2 is a flow diagram of a second embodiment of the present invention, FIG. 3 is a flow diagram of a third embodiment of the present invention, FIG. 4 is a flow diagram of a fourth embodiment of the present invention, and FIG. 5 is a flow diagram of a fifth embodiment of the present invention.

In each of the above flow diagrams of the various embodiments of the present inventions like numbers denote like parts.

Referring to FIG. 1, an absorber vessel consists of a lower larger part partitioned from an upper smaller part by a liquor collecting tray 2 provided with a central opening duct 3 surmounted by a cowl 4. A first absorption zone 5 is contained in the lower larger part of the vessel and a second absorption zone 6 is contained in the upper smaller part of the vessel, each absorption zone comprising packing material such as contact rings.

The gaseous mixture containing the acidic gases enters near the bottom of the lower larger part of the vessel through a conduit 7 and passes upwardly through the first absorption zone 5 countercurrent to a flow of a hot aqueous solution of a non-volatile reagent, such as potassium carbonate or tripotassium phosphate, and a volatile reagent, such as monoethanolamine or diethanolamine, hereafter called the first absorbent solution, introduced near the top of the lower larger part of the vessel through a conduit 8 and spray device 9. The gaseous mixture, together with some of the volatile reagent vaporised from the first absorbent solution, passes through the duct 3 in the liquor collecting tray 2 and passes upwardly through the second absorption zone 6 countercurrent to a flow of a cooled aqueous solution of said volatile reagent, hereafter called the second absorbent solution, introduced near the top of the upper smaller part of the vessel through a conduit 10 and spray device 11. A major fraction of the acidic gases contained in the entering gaseous mixture is removed by absorption in the first absorbent solution in the first absorption zone and substantially the remaining acidic gases in the gaseous mixture leaving the first absorption zone are removed by absorption in the second absorbent solution in the second absorption zone. The volatile reagent which is carried away with the hot gaseous mixture leaving the first absorption zone is absorbed in the second absorption solution in the second absorption zone.

The gaseous mixture purified from the acidic gases leaves the top of the vessel 1 through a conduit 12. The spent first absorbent solution containing acidic gases dissolved therein passes out at the bottom of the vessel 1 through a conduit 13 to the heating side of an indirect heat exchanger 14 and the spent second absorbent solution containing acidic gases dissolved therein passes out through an outlet in the wall of the liquor collecting tray 3 and a conduit 15 to the cooling side of the heat exchanger 14.

A regenerator vessel 16 consists of an upper larger part partitioned from a lower small part by a liquor collecting tray 17 provided with a central opening duct 18 surmounted by a cowl 19. A first regeneration zone 20 is contained in the upper larger part of the vessel and a second regeneration zone 21 is contained in the lower smaller part of the vessel, each regeneration zone comprising packing material, such as contact rings. The lower part of the lower smaller part of the vessel is provided with a liquor collecting tray 22 with a central opening duct 23 surmounted by a cowl 24. The liquor collecting tray 22 is connected through an outlet in its wall and a conduit 25 to a reboiler 26. The liquor collecting tray 17 is provided with a heating coil 50, which is heated by a heating medium, such as steam, entering through a conduit 51 and leaving through a conduit 52.

Regenerated second absorbent solution passes from the liquor collecting tray 22 through a conduit 25 to the reboiler 26 which is heated by a heating medium, such as steam, entering through a conduit 28, passing through heating tubes 27, and leaving through a conduit 29. Steam raised in the reboiler passes through a conduit 30 into the lower part of the lower smaller part of the vessel 16 and then upwardly through the second regeneration zone 21 countercurrent to a flow of the spent second absorbent solution which has been heated in the heat exchanger 14 and is introduced near the top of the lower smaller part of the vessel through a conduit 31 and spray device 32. This stripping steam together with any steam flashed from the entering heated spent second absorbent solution, then passes through the duct 18 in the liquor collecting tray 17 and upwardly through the first regeneration zone 20 countercurrent to a flow of spent first absorbent solution which has been cooled in the heat exchanger 14 and is introduced near the top of the upper larger part of the vessel through a conduit 33 and spray device 34.

The stripping steam passed from the reboiler 26 into the second regeneration zone is preferably the minimum required for satisfactory regeneration of the spent second absorbent solution entering the second regeneration zone, and in this case the steam discharged from the second regeneration zone together with any steam flashed from the entering heated spent second absorbent solution may be insufficient for satisfactory regeneration of the spent first absorbent solution entering the first regeneration zone. The required additional steam for satisfactory regeneration of the spent first absorbent solution could be provided by increasing the flow of steam to the second regeneration zone but this would have the disadvantage of diluting the first absorbent solution in the first regeneration zone by condensation of the steam entering from the second regeneration zone. To avoid such undesired dilution of the first absorbent solution in the first regeneration zone the flow of stripping steam to the second regeneration zone is maintained at around the minium required for satisfactory regeneration of the spent second absorbent solution and the required additional steam for satisfactory regeneration of the spent first absorbent solution is provided by means of the heating coil 50. The steam discharge from the second regeneration zone and entering the first regeneration zone carries with it acidic gases evolved in the second regeneration zone and some of the volatile reagent vaporised from the second absorbent solution. Said acidic gases mix with the acidic gases evolved in the first regeneration zone and said volatile reagent is absorbed in the first absorbent solution in the first regeneration zone. The steam discharged from the first regeneration zone, together with evolved acidic gases and some of the volatile reagent vaporised from the first absorbent solution, leaves the top of the vessel 16 through a conduit 41 and passes to an air cooled cooler/condenser 42 in which the gases are cooled and steam condensed as condensate. The condensate contains the volatile reagent carried away with the steam and evolved acidic gases. The mixture of cooled acidic gases and condensate passes through a conduit 43 to a separator/accumulator 44 in which the condensate is separated from the cooled acidic gases. The cooled acidic gases leave the top of the vessel 44 through a conduit 49. The condensate, containing some volatile reagent, leaves the bottom of the vessel 44 through a conduit 45 and is returned to the regenerated first absorbent solution as reflux to the top of the regenerator vessel 16 through spray device 46. Any excess condensate over that required to maintain a condensate balance over the plant as a whole may be bled off through a conduit 47 and regulating valve 48.

The regenerated second absorbent solution passes over a weir 53 in the reboiler 26 and through a conduit 54 to the lower part of the vessel 16, below the liquor collecting tray 22, and passes out from the bottom of the vessel through a conduit 35 to a cooler 36, where it is air-cooled. The cooled regenerated second absorbent solution passes through a conduit 37 to a pump 38, which delivers it through the conduit 10 into the upper smaller part of the absorber vessel 1. The regenerated first absorbent solution passes out through an outlet in the wall of the liquor collecting tray 17 and a conduit 39 to a pump 40, which delivers it through the conduit 8 into the lower larger part of the absorber vessel 1.

Referring to FIG. 2, the spent first absorbent solution passes out at the bottom of the absorber vessel 1 through the conduits 13 and 33 and spray device 34 directly into the upper larger part of the regenerator vessel 16, near its top, where flashing of steam and evolution of acidic gases takes place. The spent second absorbent solution passes out through an outlet in the wall of the liquor collecting tray 3 and the conduit 15 to the cooling side of an indirect heat exchanger 55 and the regenerated second absorbent solution passes out at the bottom of the regenerator vessel 16 through the conduit 35 to the heating side of the heat exchanger 55. The spent second absorbent solution which has been heated in the heat exchanger 55 is introduced near the top of the lower smaller part of the regenerator vessel 16 through the conduit 31 and spray device 32. The regenerated second absorbent solution which has been cooled in the heat exchanger 55 passes through a conduit 56 to the cooler 36, where it is air-cooled, and then through the conduit 37 to the pump 38, which delivers it through the conduit 10 into the upper smalltr part of the absorber vessel 1.

The liquor collecting tray 17 of the regenerator vessel 16 is coupled to a reboiler 57 and regenerated first absorbent solution passes from the tray 17 through a conduit 63 to the reboiler 57 which is heated by a heating medium, such as steam, entering through a conduit 59, passing through heating tubes 58, and leaving through a conduit 60. Steam raised in the reboiler passes through a conduit 62 into the lower part of the upper larger part of the vessel 16 and mixes with the steam and evolved acidic gases entering through the duct 18 in the tray 17.

The regenerated first absorbent solution passes over a weir 61 in the reboiler 57 and through a conduit 64 to the pump 40, which delivers it through the conduit 8 into the lower larger part of the absorber vessel 1.

Referring to FIG. 3, the reboiler 26 is heated by a hot gaseous mixture, containing acidic gases, under pressure and saturated with water vapour which is subsequently passed into the absorber vessel 1. The hot gaseous mixture enters the reboiler through the conduit 28, passes through the heating tubes 27 and leaves the reboiler through the conduit 29 at a higher temperature than the temperature of the spent second absorbent solution leaving the upper smaller part of the absorber vessel 1 through the conduit 15. The hot gaseous mixture passes through the conduit 29 into the bottom part of a scrubber vessel 65 provided with a zone 66 comprising packing material, such as contact rings, or a number of bubble-type or sieve plate trays. The hot gaseous mixture passes upwardly through the zone 66 countercurrent to a flow of the spent second absorbent solution introduced near the top of the vessel 65 through the conduit 15 and spray device 15a, the spent second absorbent solution becoming heated and the gaseous mixture becoming cooled by direct heat exchange. The heated spent second absorbent solution passes out from the bottom of the vessel 65 through the conduit 31 and is introduced into the top part of the lower smaller part of the regenerator vessel 16 through the spray device 32. The cooled gaseous mixture which is still hot, passes out at the top of the vessel 65 through the conduit 7 and enters the lower larger part of the absorber vessel 1 near its bottom.

Referring to FIG. 4, which illustrates an embodiment of the present invention in which a more volatile reagent, such as monoethanolamine, is employed and in which the second regeneration zone is maintained at a higher pressure than the first regeneration zone, the first regeneration zone 20 is contained in a vessel 16a and the second regeneration zone 21 is contained in a vessel 16b. The steam discharged from the second regeneration zone is passed through a conduit 75 and pressure control valve 76 into the bottom part of a scrubber vessel 73 provided with a zone 74 comprising packing material, such as contact rings, or a number of bubble-type or sieve plate trays. The top of the vessel 73 is connected by a conduit 79 with the bottom part of the vessel 16a and the control valve 76 is adjusted so that the pressure in the vessel 16b is substantially higher than the pressure in the vessels 73 and 16a. The steam entering the vessel 73 carries with it acidic gases evolved in the second regeneration zone and some volatile reagent vaporised from the second absorbent solution and passes upwardly through the zone 74 countercurrent to a flow of condensate, containing some volatile reagent, passing out at the bottom of the separator/accumulator 44 through a conduit 70 and introduced into the top part of the vessel 73 through a spray device 71. The regenerated second absorbent solution leaves the bottom of the vessel 16b through the conduit 35 and a control valve 83 and enters a separator vessel 84 the top of which is connected by a conduit 85 with the bottom part of the vessel 73 so that the pressure in the vessel 84 is substantially the same as the pressure in the vessel 73. Due to a reduction in pressure steam is flashed from the hot regenerated second absorbent solution entering the vessel 84 and passes out at the top of the vessel through the conduit 85, entering the bottom part of the vessel 73 and mixing with the steam entering the vessel 73 through the conduit 75. The steam is flashed in the vessel 84 and carries with it some volatile reagent vaporized from the second absorbent solution.

The volatile reagent contained in the mixture of steam and evolved acidic gases passing upwardly through the zone 74 in the vessel 73 is absorbed in the descending condensate and the condensate, enriched in the volatile reagent, leaves the bottom of the vessel 73 through a conduit 80 and passes to a pump 81 which delivers it through a conduit 82 into the regenerated second absorbent solution at the bottom of the vessel 16b. The steam and evolved acidic gases, stripped from the volatile reagent, pass from the top of the vessel 73 through the conduit 79 into the bottom part of the vessel 16a.

The hot regenerated second absorbent solution in the vessel 84, partially cooled by the flashing of steam leaves the bottom of the vessel through a conduit 86 and passes to a pump 87 which delivers a main stream through conduits 88 and 89 to a cooler 90 which is cooled by water entering through a conduit 91 and leaving through a conduit 92. The cooled main stream of regenerated second absorbent solution leaves the cooler 90 through the conduit 10 and enters the top part of the absorber vessel 1 through the spray device 11.

A sidestream of hot regenerated second absorbent solution may be passed through a conduit 98 and valve 99 to a reboiler 93 which is heated by a heating medium, such as steam, entering through a conduit 95, passing through heating tubes 94 and leaving through a conduit 96. A major fraction of the sidestream absorbent solution is vaporised in the reboiler and the vapour, containing a major fraction of the volatile reagent passes through a conduit 104 and valve 72 into the lower part of the vessel 16b. The effluent solution, containing a minor fraction of the volatile reagent, passes over a weir 97 in the reboiler 93 and through a conduit 100 and valve 101 into the lower part of the vessel 16a.

With the valves 99, 101 and 72 closed the reboiler 93 may be isolated from the flow circuit and a sidestream of hot regenerated second absorbent solution may be passed through a conduit 102 and valve 103 directly into the lower part of the vessel 16a. When the reboiler 93 is in circuit the valve 103 is closed and the valves 99, 101 and 72 are open.

Where some of the non-volatile reagent is carried over by entrainment in gas or steam from the first absorbent solution into the second absorbent solution, build up of the non-volatile reagent in the second absorbent solution can be avoided by passing a sidestream of the regenerated second absorbent solution into the regenerated first absorbent solution by the means described above.

The steam discharged from the first regeneration zone, together with evolved acidic gases and some of the volatile reagent vaporised from the first absorbent solution leaves the top of the vessel 16a through the conduit 41 and passes to a cooler/condenser 67 which is cooled by water entering through a conduit 68 and leaving through a conduit 69, and in which the gases are cooled and steam condensed as condensate.

Any excess condensate over that required to maintain a condensate balance over the plant as a whole may be bled off through a conduit 77 and regulating valve 78.

Referring to FIG. 5, which illustrates an embodiment of the present invention alternative to that described with reference to FIG. 4, a scrubber vessel 124 provided with a zone 125 comprising packing material, such as contact rings, or a number of bubble-type or sieve plate trays is connected at its bottom part by the conduit 75 and pressure control valve 76 with the top of the vessel 16b and by a conduit 130 and control valve 131 with the bottom part of the vessel 16b. The steam leaving the top of the vessel 16b, carrying with it acidic gases evolved in the second regeneration zone and some volatile reagent vaporised from the second absorbent solution passes through the conduit 75 and control valve 76 into the bottom part of the vessel 124. The regenerated second absorbent solution leaves the bottom of the vessel 16b through the conduit 130 and control valve 131 and passes into the bottom part of the vessel 124, in which steam is flashed from the hot regenerated second absorbent solution. This flashed steam carries with it some volatile reagent vaporised from the second absorbent solution.

The volatile reagent contained in the mixture of steam and evolved acidic gases passing upwardly through the zone 125 in the vessel 124 is absorbed in descending condensate, containing some volatile reagent, introduced near the top of the vessel 124 through a conduit 122 and spray device 123. The steam and evolved acidic gases, stripped from the volatile reagent, pass upwardly through an entrainment eliminator 127 attached to a ring 126 and pass from the top of the vessel 124 through a conduit 128 into the bottom part of the vessel 16a.

The hot regenerated second absorbent solution in the vessel 124, partially cooled by the flashing of steam, together with condensate leaves the bottom of the vessel through a conduit 129 and passes to a cooler 132 which is cooled by water entering through a conduit 133 and leaving through a conduit 134. The cooled regenerated second absorbent solution leaves the cooler 132 through the conduit 37 and passes to the pump 38 which delivers a main stream through conduits 135 and 10 to the top part of the absorber vessel 1 through the spray device 11.

A sidestream of the cooled regenerated absorbent solution may be passed through a conduit 136 and valve 137 into the lower part of the vessel 16a.

The steam discharged from the first regeneration zone, together with evolved acidic gases and some of the volatile reagent vaporised from the first absorbent solution leaves the top of the vessel 16a through the conduit 41 and passes to a first cooler/condenser 109 which is cooled by water entering through a conduit 110 and leaving through a conduit 111, and in which the gases are partially cooled and the steam partially condensed as condensate. The mixture of partially cooled acidic gases and condensate passes through the conduit 43 to a first separator/accumulator 112 in which the condensate is separated from the partially cooled acidic gases. The condensate containing the bulk of the volatile reagent carried over with the steam discharged from the first regeneration zone, leaves the bottom of the vessel 112 through a conduit 121 and passes into the regenerated first absorbent solution at the bottom of the vessel 16a. The partially cooled acidic gases together with water vapour passes upwardly into the vessel 112 through an entrainment eliminator 113 and leaves the top of this vessel through a conduit 114 and passes to a second cooler/condenser 115 which is cooled by water entering through a conduit 116 and leaving through a conduit 117, and in which the gases are further cooled and water vapour condensed as condensate. The mixture of cooled acidic gases and condensate passes through a conduit 118 to a second separator/accumulator 119 in which the condensate is separated from the cooled acidic gases. The condensate, containing some volatile reagent, leaves the bottom of the vessel 119 through a conduit 122 and passes into the top part of the scrubber vessel 124 through the spray device 123.

Any excess condensate over that required to maintain a condensate balance over the plant as a whole may be bled off through a conduit 138 and valve 139.

The cooled acidic gases leave the top of the vessel 119 through a conduit 120.

An entrainment eliminator 106 attached to a ring 105 is provided in the space between the lower larger part and the upper small part of the absorber vessel 1, and an entrainment eliminator 108 attached to a ring 107 is provided in the top part of the vessel 1, positioned above the spray device 11.

A cooling coil 140 is provided in the space below the second absorption zone 6 and above the liquor collecting tray 2. Cooling water enters the coil 140 through conduit 141 and leaves through conduit 142. The gaseous mixture entering the second absorption zone 6 and the spent second absorbent solution leaving this zone are both cooled by the coil 140 resulting in a cooled spent second absorbent solution collecting on the tray 2.

The present invention is now further illustrated by, but is in no manner limited to, the following examples.

EXAMPLE 1

An arrangement of process flow and equipment according to the accompanying drawing is employed.

The first absorbent solution is an aqueous solution of potassium carbonate activated with diethanolamine, containing 30% by weight of potassium carbonate and 3% by weight of diethanolamine.

The second adsorbent solution is an aqueous solution of diethanolamine containing 20% by weight of diethanolamine.

The feed gaseous mixture entering the absorber vessel 1 through conduit 7 is a gas containing 21.92% by volume of carbon dioxide and is at 273 p.s.i.a. and 240° F., saturated with water vapour. It is passed at the rate of 155,663 Nm.$^3$ per hour and is scrubbed in the first absorption zone 5 with the first absorbent solution introduced through conduit 8 and spray device 9 at 226° F., and in the second absorption zone 6 with the second absorbent solution introduced through conduit 10 and spray device 11 at 122° F. The first absorbent solution is circulated at the rate of 3,570,000 lb. per hour and the second absorbent solution is circulated at the rate of 438,000 lb. per hour. The gaseous mixture purified from carbon dioxide contains 0.1% by volume of carbon dioxide and leaves the absorber vessel through conduit 12 at the rate of 121,428 Nm$^3$ per hour.

The spent first absorbent solution leaves the absorber vessel through conduit 13 at 242° F. and containing 137,000 of carbon dioxide per hour.

The spent second absorbent solution leaves the absorber vessel through conduit 15 at 190° F. and containing 10.260 lb. of carbon dioxide per hour.

In the heat exchanger 14 the spent first absorbent solution is cooled from 242° F. to 236.2° F., at which temperature it enters the regenerator vessel 16 through conduit 33 and spray device 34, some steam being produced by flashing, and the spent second absorbent solution is heated from 190° F. to 230° F., at which temperature it enters the regenerator vessel through conduit 31 and spray device 32, some steam being produced by flashing. The pressure at the bottom of the regenerator vessel is 19 p.s.i.a.

The heat input into the heating tubes 27 of the reboiler 26 and the heating coil 50 for raising stripping steam is 105×10$^6$ B.t.u. per hour.

The regenerated first absorbent solution leaves the regenerator vessel through conduit 39 at 226° F., at which temperature it is introduced into the absorber vessel.

The regenerated second adsorbent solution leaves the regenerator vessel through conduit 35 at 230° F. and is cooled in the cooler 36 to 122° F., at which temperature it is introduced into the absorber vessel.

EXAMPLE 2

An arrangement of process flow and equipment according to FIG. 5 is employed.

The first absorbent solution is an aqueous solution of potassium carbonate activated with monoethanolamine, containing 30% by weight of potassium carbonate and 6% by weight of monoethanolamine.

The second absorbent solution is an aqueous solution of monoethanolamine containing 15% by weight of monoethanolamine.

The feed gaseous mixture entering the absorber vessel 1 through the conduit 7 is a gas containing 21.92% by volume of carbon dioxide and is at 25.0 kg/cm.$^2$ gauge pressure and at 116° C., saturated with water vapour. It is passed at the rate of 155,663 Nm.$^3$ per hour and is scrubbed in the first absorption zone 5 with the first absorbent solution introduced through the conduit 8 and spray device at 109° C., and in the second absorbent zone 6 with the second absorbent solution introduced through the conduit 10 and spray device 11 at 40° C. The first absorbent solution is circulated at the rate of 1,670,000 kg. per hour and the second absorbent solution is circulated at the rate of 125,000 kg. per hour. The bulk of the carbon dioxide in the entering gaseous mixture is removed in the first absorption zone by absorption in the first absorbent liquor and the gaseous mixture which enters the second absorption zone contains 2.0% by volume of carbon dioxide and carries with it 43 kg. per hour of monoethanolamine and less than 1 kg. per hour of potassium carbonate. The purified gaseous mixture leaves the absorber vessel through the conduit 12 at 43° C., at the rate of 121,513 Nm.$^3$ per hour, containing 0.1% by volume of carbon dioxide and carrying with it less than 0.5 kg. per hour of monoethanolamine.

The spent first absorbent solution leaves the absorber vessel through the conduit 13 at 121° C. and passes to the heat exchanger 14 where it is cooled to 118° C., at which temperature it enters the regenerator vessel 16a through the conduit 33 and spray device 34, steam being flashed and carbon dioxide evolved at the top part of this vessel.

The spent second absorbent solution leaves the absorber vessel at 78° C. and passes to the heat exchanger 14 where it is heated to 110° C., at which temperature it enters the regenerator vessel 16b through the conduit 31 and spray device 32.

Heating steam is passed through the conduit 28 to the reboiler 26 coupled to the regenerator vessel 16b at the rate of 17,200 kg. per hour, and heating steam is passed through the conduit 59 to the reboiler 57 coupled to the regenerator vessel 16a at the rate of 41,200 kg. per hour.

The pressure at the bottom of the regenerator vessel 16a is 0.23 kg./cm.$^2$ and the regenerated first absorbent solution leaves the reboiler 57 at 109° C., at which temperature it is delivered by the pump 40 into the first absorption zone of the absorber vessel.

The pressure at the bottom of the regenerator vessel 16b is 2.5 kg./cm.$^2$ and the regenerated second absorbent solution leaves the bottom of this vessel at 140° C. and passes through the conduit 130 and control valve 131 into the bottom part of the scrubber vessel 124, which is at 0.28 kg./cm.$^2$ pressure. In the vessel 124 steam is flashed from the regenerated second absorbent solution and the solution at the bottom of the vessel becomes cooled to 110° C.

The mixture of steam and carbon dioxide, evolved in the regenerator vessel 16b, leaving the top of the vessel 124 contains 2,350 Nm.$^3$ per hour of carbon dioxide and carries with it less than 1 kg. per hour of monoethanolamine.

In the regenerator vessel 16a carbon dioxide is evolved from the spent first absorbent solution at the rate of 31,500 Nm.$^3$ per hour and the mixture of steam and carbon dioxide leaving the top of this vessel through the conduit 41 at 92° C., carries with it 296 kg. per hour of monoethanolamine. This mixture is cooled to and partially condensed in the cooler/condenser 109 at 75° C. and condensate comprising 30,000 kg. per hour of water and 292 kg. per hour of monoethanolamine leaves the bottom of the vessel 112 and passes through the conduit 121 to mix with the regenerated first absorbent solution in the bottom of the regenerator vessel 16a.

The mixture of carbon dioxide and water vapour leaving the top of the vessel 112 through the conduit 114 carries with it 4 kg. per hour of monoethanolamine and less than 1 kg. per hour of potassium carbonate. This mixture is further cooled in the cooler/condenser 115 to 43° C., the condensate being separated in the vessel 119. The condensate comprising 13,800 kg. per hour of water and 4 kg. per hour of monoethanolamine leaves the bottom of the vessel 119 through the conduit 122 and is divided so that 7,550 kg. per hour of water and 2.2 kg. per hour of monoethanolamine is passed through the spray device 123 into the scrubber vessel 124, and 6,250 kg. per hour of water and 1.8 kg. per hour of monoethanolamine is bled through the conduit 138 and valve 139 to waste.

The vessel 119 is at a pressure of 0.03 kg./cm.$^2$ gauge and 33,850 Nm.$^3$ per hour of carbon dioxide leaves the top of this vessel through the conduit 120.

The hot regenerated second absorbent solution in the vessel 124 leaves the vessel through the conduit 129 at 110° C. and is cooled in the cooler 132 to 40° C. The cooled solution is circulated by the pump 38 at the rate of 125,000 kg. per hour, of which a small sidestream at the rate of 277 kg. per hour is passed through the conduit 136 and valve 137 to the regenerated first absorbent solution at the bottom of the vessel 16a and the balance (124,723 kg. per hour) passed through the conduit 10 and spray device 11 into the top part of the absorber vessel 1. The circulated regenerated second absorbent solution contains less than 0.1% by weight of potassium carbonate.

I claim:

1. In a process for the removal of acidic gases from gaseous mixtures which comprises the steps of passing the gaseous mixture through a first absorption zone in contact with a first absorbent solution comprising hot aqueous solution of a non-volatile, acid-gas absorbing reagent selected from alkali metal carbonates and alkali metal phosphates and a volatile, acid-gas absorbing alkanolamine to remove a major fraction of the acidic gases, passing the resulting gaseous mixture through a second absorption zone in contact with a second absorbent solution comprising a cooled aqueous solution of the same volatile, acid-gas absorbing alkanolamine as is present in said first absorbent solution to remove substantially the remaining acidic gases from the gaseous mixture, passing the spent solution containing acidic gases dissolved therein from the second absorption zone to a second regeneration zone, passing a stream of steam in contact with the spent aqueous solution of said volatile, acid-gas absorbing alkanolamine in the second regeneration zone to strip the acidic gases therefrom, discharging the stripping steam from the second regeneration zone, passing the spent solution containing acidic gases dissolved therein from the first absorption zone to a first regeneration zone, passing the stripping steam discharged from the second regeneration zone in contact with the spent aqueous solution of said non-volatile, acid-gas absorbing reagent and said volatile, acid-gas absorbing alkanolamine in the first regeneration zone to strip the acidic gases therefrom, returning the regenerated solutions from their respective regeneration zones to their respective absorption zones, the improvement comprising passing supplementary stripping steam to the first regeneration zone and heating the spent absorbent solution leaving the second absorption zone by indirect heat exchange with hot spent absorbent solution leaving the first absorption zone.

2. A process according to claim 1, wherein the flow of stripping steam to the second regeneration zone is maintained at the minimum required for satisfactory regeneration of the spent absorbent entering the second regeneration zone.

3. A process according to claim 1, wherein the gaseous mixture leaving the first absorption zone is cooled by indirect heat exchange with a coolant prior to entering the second absorption zone.

4. A process according to claim 1, wherein said first absorbent solution comprises potassium carbonate or tripotassium phosphate as the non-volatile reagent and monoethanolamine or diethanolamine as the volatile alkanolamine and said second absorbent solution comprises monoethanolamine or diethanolamine.

5. A process according to claim 1, wherein said first absorbent solution has a major concentration of the non-volatile reagent and a minor concentration of the volatile alkanolamine.

6. A process according to claim 4, wherein said first absorbent solution comprises from 5 to 30% by weight of potassium carbonate and from 1 to 20% by weight of monoethanolamine or diethanolamine.

7. A process according to claim 6, wherein said first absorbent solution comprises from 30 to 35% by weight of potassium carbonate and from 2 to 6% by weight of the amine.

8. A process according to claim 1, wherein said second absorbent solution comprises from 5 to 30% by weight of monoethanolamine or diethanolamine.

9. A process according to claim 1, wherein the flow of stripping steam to each regeneration zone is controlled and said volatile, acid-gas absorbing alkanolamine carried over with the mixture of steam and evolved acidic gases at least leaving the first regeneration zone is recovered so that the concentrations of the volatile, acid-gas absorbing alkanolamine in the regenerated solutions entering the first and second absorption zones are maintained substantially constant.

10. In a process for the removal of acidic gases from gaseous mixtures which comprises the steps of passing the gaseous mixture through a first absorption zone in contact with a first absorbent solution comprising a hot aqueous solution of a non-volatile, acid-gas absorbing reagent selected from alkali metal carbonates and alkali metal phosphates and a volatile, acid-gas absorbing alkanolamine to remove a major fraction of the acidic gases, passing the resulting gaseous mixture through a second absorption zone in contact with a second solution comprising a cooled aqueous solution of the same volatile, acid-gas absorbing alkanolamine as is present in said first absorbent solution to remove substantially the remaining acidic gases from the gaseous mixture, passing the spent solution containing acidic gases dissolved therein from the second absorption zone to a second regeneration zone, passing a stream of steam in contact with the spent aqueous solution of said volatile, acid-gas absorbing alkanolamine in the second regenera- the stripping steam from the second regeneration zone, passing the spent solution containing acidic gases dissolved therein from the first absorption zone to a first regeneration zone, passing the stripping steam discharged from the second regeneration zone in contact with the spent aqueous solution of said non-volatile, acid-gas absorbing reagent and said volatile, acid-gas absorbing alkanolamine in the first regeneration zone to strip the acidic gases therefrom, and returning the regenerated solutions from their respective regeneration zones to their respective absorption zones, the improvement comprising (a) controlling the flow of stripping steam to each regeneration zone and recovering said volatile, acid-gas absorbing alkanolamine carried over with the mixture of steam and evolved acidic gases at least leaving the first regeneration zone so that the concentrations of the volatile, acid-gas absorbing alkanolamine in the regenerated solutions entering the first and second absorption zones are maintained substantially constant and (b) withdrawing a side stream of the regenerated solution leaving said second regeneration zones, vaporising a major fraction of said side stream, the vapor so formed comprising a major fraction of the volatile alkanolamine, passing said vapor to the second regeneration zone, and passing the remaining liquor, comprised of the non-volatile reagent and a minor fraction of volatile alkanolamine, to the regenerated solution leaving the first regeneration zone.

11. In a process for the removal of acidic gases from gaseous mixtures which comprises the steps of passing the gaseous mixture through a first absorption zone in contact with a first absorbent solution comprising a hot aqueous solution of a non-volatile, acid-gas absorbing reagent selected from alkali metal carbonates and alkali metal phosphates and a volatile, acid-gas absorbing alkanolamine to remove a major fraction of the acidic gases, passing the resulting gaseous mixture through a second absorption zone in contact with a second absorbent solution comprising a cooled aqueous solution of the same volatile, acid-gas absorbing alkanolamine as is present in said first absorbent solution to remove substantially the remaining acidic gases from the gaseous mixture, passing the spent solution containing acidic gases dissolved therein from the second absorption zone to a second regeneraton zone, passing a stream of steam in contact with the spent aqueous solution of said volatile, acid-gas absorbing alkanolamine in the second regeneration zone to strip the acidic gases therefrom, discharging the stripping steam from the second regeneration zone, passing the spent solution containing acidic gases dissolved therein from the first absorption zone to a first regeneration zone, passing the stripping steam discharged from the second regeneration zone in contact with the spent aqueous solution of said non-volatile, acid-gas absorbing reagent and said volatile, acid-gas absorbing alkanolamine in the first regeneration zone to strip the acidic gases therefrom, and returning the regenerated solutions from their respective regeneration zones to their respective absorption zones, the improvement comprising (a) controlling the flow of stripping steam to each regeneration zone and recovering said volatile, acid-gas absorbing alkanolamine carried over with the mixture of steam and evolved acidic gases at least leaving the first regeneration zone so that the concentrations of the volatile, acid-gas absorbing alkanolamine in the regenerated solutions entering the first and second absorption zones are maintained substantially constant and (b) withdrawing a side stream of the regenerated solution leaving the second regeneration zone and adding said side stream to the regenerated solution leaving the first regeneration zone.

References Cited

UNITED STATES PATENTS

| 2,886,405 | 5/1959 | Benson et al. | 423—232 |
| 3,101,996 | 8/1963 | Bresler et al. | 423—229 |
| 3,144,301 | 8/1964 | Mayland | 423—229 |
| 3,288,557 | 11/1966 | Bresler | 423—229 |

FOREIGN PATENTS

| 770,493 | 3/1957 | Great Britain | 423—232 |
| 870,895 | 6/1961 | Great Britain | 423—232 |

EARL C. THOMAS, Primary Examiner

U.S. Cl. X.R.

423—229, 232

UNITED STATES PATENT OFFICE
CERTIFICATE OF CORRECTION

Patent No. 3,773,895　　　　　　　　　Dated November 20, 1973

Inventor(s)　　Harry Thirkell

It is certified that error appears in the above-identified patent and that said Letters Patent are hereby corrected as shown below:

In the heading:

[73] Assignee: THE POWER-GAS CORPORATION LIMITED, Stockton-on-Tees, England

Signed and sealed this 18th day of June 1974.

(SEAL)
Attest:

EDWARD M. FLETCHER, JR.　　　　　　　C. MARSHALL DANN
Attesting Officer　　　　　　　　　　Commissioner of Patents